United States Patent [19]

Callighan et al.

[11] B 4,003,850

[45] Jan. 18, 1977

[54] NOVEL IRON OXIDE CATALYSTS

[75] Inventors: Robert H. Callighan, Verona; John O. Hawthorne, Penn Hills Township, both of Pa.

[73] Assignee: United States Steel Corporation, Pittsburgh, Pa.

[22] Filed: Aug. 23, 1973

[21] Appl. No.: 390,979

[44] Published under the second Trial Voluntary Protest Program on March 23, 1976 as document No. B 390,979.

Related U.S. Application Data

[63] Continuation of Ser. No. 186,557, Oct. 4, 1971, abandoned.

[52] U.S. Cl. .................. 252/455 R; 252/459; 252/466 J; 252/472
[51] Int. Cl.² ............................ B01J 29/06
[58] Field of Search ............ 252/455 R, 459, 466 J, 252/472; 423/632, 633

[56] References Cited

UNITED STATES PATENTS

| | | | |
|---|---|---|---|
| 2,250,421 | 7/1941 | Riblett | 252/472 X |
| 2,661,338 | 12/1953 | Lanning | 423/633 X |
| 3,361,531 | 1/1968 | Erb et al. | 423/633 X |
| 3,414,378 | 12/1968 | Stedman | 252/472 X |
| 3,547,582 | 12/1970 | Arakawa | 423/633 X |

OTHER PUBLICATIONS

"Chemical Abstracts", 46, 1952, p. 10994h.
"Chemical Abstracts", 67, 1967, p. 45635k.

*Primary Examiner*—Paul F. Shaver
*Attorney, Agent, or Firm*—William L. Krayer

[57] ABSTRACT

Iron oxide catalysts prepared by absorbing iron pentacarbonyl upon a suitable support followed by oxidation to iron oxide.

6 Claims, No Drawings

NOVEL IRON OXIDE CATALYSTS

This application is a continuation of application Ser. No. 186,557, filed Oct. 4, 1971, now abandoned.

BACKGROUND AND SUMMARY

A class of catalysts in present use for a variety of reactions is the metal and metal oxide class usually comprising a metal or metal oxide deposited on a support and characterized by having a high surface area. Generally, such catalysts are prepared by mixing the appropriate metal or metal oxide with an inert filler and compacting the resulting mixture to the desired size or shape. Alternatively, they may be prepared by mixing a solution of the appropriate metal salt with a suitable support wherein the salt is absorbed on the surface of the support. After solvent removal, the support is heated in an oxidizing atmosphere to convert the metal salt to the oxide form or alternatively in a reducing atmosphere to convert the metal salt to the free metal. Normally, the solution process gives a catalyst of high surface area, provided the support has a high surface area.

This invention relates to a novel process for the preparation of iron oxide catalysts by adsorbing iron pentacarbonyl upon a suitable support, and then oxidizing the iron pentacarbonyl to an amorphous iron oxide. The many uses for such iron oxide catalysts include use in the dehydrogenation of butylene to butadiene, the conversion of ethylbenzene to styrene, the synthesis of ammonia and the removal of nitrogen oxides from exhaust gases.

The preparation of metallic iron catalysts by decomposing iron pentacarbonyl is not new. Vesterdal, U.S. Pat. No. 2,533,071, discloses the preparation of metallic iron catalysts by heating iron pentacarbonyl on a support to a temperature of about 400 – 1000°F at 1 to 30 atmospheres to degrade the iron pentacarbonyl to metallic iron. Garwood et al, U.S. Pat. No. 3,297,565, in Example 5, treat, at 395°–480°F, a support with iron pentacarbonyl in light distillate fuel and then decompose the pentacarbonyl to metallic iron by heating to 480°–645°F in a helium atmosphere. The decomposition of iron pentacarbonyl to iron oxide is also old. Chem. Abs. 46 (1952) 10994[h] discloses the preparation of crystalline iron oxides from iron pentacarbonyl and carbon monoxide. Chem. Abs. 47 (1953) 8484[e] discloses the decomposition of the pentacarbonyl by activations caused by adsorption on the walls of the reaction vessel or by illumination. Chem. Abs. 67 (1967) 45635[k] discloses the vapor phase preparation of highly dispersed iron oxide by contacting a mixture of iron pentacarbonyl in a carrier gas with a tangentially blown stream of an oxygen containing gas.

The prior art has not however recognized the benefits to be obtained by using iron pentacarbonyl as the starting material for the preparation of a highly active supported amorphous iron oxide catalyst. It is well known that chemical composition is often a poor guide in predicting the activity of a catalyst. More often than not the physical characteristics of a porous solid catalyst such as particle size, pore size, surface area and crystal structure determine efficiency as well as selectivity. In general, both chemical and physical properties together govern the activity of a catalyst, and this is determined by the method of preparation and pretreatment.

It is thus an object of this invention to prepare a highly active, amorphous, efficient and selective iron oxide catalyst, having uniformly small particle size and high surface area. Other objects will become apparent on reading further.

Our novel highly active iron oxide catalysts are prepared by vaporizing an iron carbonyl onto a suitable support using a gas as an inert carrier and oxidizing the adsorbed iron pentacarbonyl to produce an amorphous iron oxide catalyst. Our catalyst is highly active and gives improved results when used in the dehydrogenation of butylene to butadiene, the conversion of ethylbenzene to styrene and the synthesis of ammonia. It gives especially good results when used to remove nitrogen oxides from exhaust gases.

DETAILED DESCRIPTION

The iron compounds suitable for use in our process for the preparation of a highly active iron oxide catalyst are the iron carbonyls, preferably iron pentacarbonyl. The iron compound is mixed with a gas and flowed onto a suitable support.

The carrier gas may be any suitable gas unreactive with the iron carbonyl compound. Preferred examples of suitable unreactive gases include nitrogen, helium, argon, methane, carbon monoxide or mixtures thereof.

A wide variety of supports may be used. Suitable supports consist of a material which will adsorb the iron carbonyl and that are chemically inert. Non-limiting examples of suitable supports include activated alumina, modified alumina, activated carbon, silica-alumina, and molecular sieves (such as alkali metal aluminosilicates). The support may be in any of the various commonly used forms such as beads, granules, powder, or in grid or tabular form.

The first step of our new process involves injecting the iron carbonyl compound into the carrier gas. Any conventional method of mixing a liquid and a gas may be used. We prefer to sweep the surface of a body of the iron carbonyl compound with the carrier gas. The carrier gas containing the vaporized iron carbonyl is then flowed over the support at a temperature in the range of from about 0° to about 100°C and at a pressure at or above atmospheric pressure. We prefer to use a temperature in the range of about 20° to about 50°C for the adsorption and most prefer a temperature of about 25°C. Higher pressures increase the rate of adsorption, however, we prefer to use near atmospheric pressures which give satisfactory results and are preferred for the simplicity of the apparatus involved.

The flow rate of the carrier gas and carbonyl compound over the support may be varied widely. In practice, the flow rate will be varied to maintain the desired temperature during adsorption, this depending on the rate of removal of the heat of adsorption which in turn depends on the geometric configuration of the support bed. For example, the temperature will be maintained within the above limits when the flow rate through a 1.5 inch deep support bed is in the range of 225 cm/min. to 2250 cm/min., preferably about 450 cm/min. Vaporization of the iron carbonyl should continue until the support is saturated. Saturation may be determined by venting the excess gases into a solution of sulfuric acid. Unadsorbed iron carbonyl in the exit gases will dissolve in the sulfuric acid to form a green solution of ferrous sulfate.

After the support has been saturated with the iron carbonyl compound, the latter is oxidized to produce an amorphous iron oxide catalyst. Any conventional oxidizing gas may be used to oxidize the carbonyl compound. We prefer to use air or ozone and most prefer oxygen. The reaction of oxygen with iron carbonyl is highly exothermic and can be violently explosive. It is thus necessary to closely control the temperature of the oxidation reaction. We prefer to cool the support containing the adsorbed iron carbonyl and use nitrogen containing only a small amount of oxygen to prevent the temperature of the exothermic reaction from rising above about 100°C. Above 100°C, there is tendency for the iron carbonyl to be desorbed from the support before it is oxidized. We prefer to use temperatures in the range of from 30° to about 100°C. Temperatures lower than 30°C may be used during the oxidation, but this increases the time necessary to obtain complete oxidation. Oxidation is complete when there is no longer a noticeable exothermic reaction when pure oxygen gas is passed over the support. Our invention is further illustrated by the following non-limiting examples.

EXAMPLE 1

A 200 ml. gas washing-bottle that contained a coarse porosity sintered glass bottom was charged with 100 g of Alcoa H-151 one-eighth inch activated alumina spheres characterized as follows:

| Bulk Density | 51 lb/ft$^3$ | $Al_2O_3$ | 90.0% |
|---|---|---|---|
| | | $Na_2O$ | 1.4 |
| Surface Area | 390 m$^2$/g | $Fe_2O_3$ | 0.1 |
| | | $SiO_2$ | 1.7 |

The alumina spheres had been dried overnight at 250°C. The bottle was fitted with a thermometer and a gas-exit that was connected to a wash bottle containing sulfuric acid. A small gas bubbler was then charged with 20 ml. (30 g) of iron pentacarbonyl. The iron pentacarbonyl was then swept with nitrogen at a flow rate of 1.7 liters/minute to vaporize it onto the alumina. The adsorption was exothermic and the temperature rose from 25° to 45°C in 10 minutes and then subsided. Some unadsorbed iron pentacarbonyl appeared in the exit gases after 1.5 hours. Vaporization was complete in 2 hours. The reactor was cooled to 10°C and swept with nitrogen. Small amounts of oxygen were then blended with the nitrogen in such a manner that the exothermic reaction did not increase the temperature above about 35°C. As the exothermic reaction subsided, the amount of oxygen was increased. After 2 hours, there was no longer an exotherm when pure oxygen was passed over the support. There was obtained 115 g of brown iron oxide catalyst. The product was analyzed and found to contain 7.7 percent total iron. X-ray diffraction analysis did not show a characteristic pattern, indicating that the iron oxide obtained was amorphous.

EXAMPLE 2

The procedure of Example 1 was repeated except that the support consisted of 101 g of Harshaw AL-1602 tabular one-eighth inch silica-alumina support characterized as follows:

| Bulk Density | 52 lb/ft$^3$ | $Al_2O_3$ | 91% |
|---|---|---|---|
| Surface Area | 210–240 m$^2$/g | $SiO_2$ | 6% |

The support was saturated with iron carbonyl and oxidized as in Example 1. There was obtained 109 g. of brown iron oxide catalyst. The total iron content was found to be 4.98 percent. X-ray diffraction studies indicated that the iron oxide was amorphous.

EXAMPLE 3

The procedure of Example 1 was repeated except that the support consisted of 101 g of Alcoa F-1 4–10 mesh activated alumina characterized as follows:

| Bulk Density | 52 lb/ft$^3$ | $Al_2O_3$ | 92.00% |
|---|---|---|---|
| | | $Na_2O$ | .90% |
| Surface Area | 210 m$^2$/g | $Fe_2O_3$ | .08% |
| | | $SiO_2$ | .09% |

After saturating with iron pentacarbonyl and oxidizing with oxygen, there was obtained 109 g of iron oxide catalyst. The total iron content of the catalyst was found to be 4.59 percent, and X-ray diffraction studies indicated that the iron oxide was amorphous.

EXAMPLE 4

The procedure of Example 1 was repeated except that the support consisted of 110 g of Linde 13X one-sixteenth inch tabular molecular sieves characterized as follows:

| Bulk Density | 38 lb/ft$^3$ | Sodium aluminosilicate $Na_2O.Al_2O_3.2.5 SiO_2$ |
|---|---|---|
| Surface Area | 650–800 m$^2$/g | |

After saturating with iron pentacarbonyl and oxidizing with oxygen, there was obtained 109 g of iron oxide catalyst. The total iron content of the catalyst was found to be 6.0 percent, and X-ray diffraction studies indicated that the iron oxide was amorphous.

EXAMPLE 5

This example shows that the iron oxide catalysts prepared by the method of this disclosure are effective for removing nitrogen oxides from gas streams. Nitrogen oxides are well known to be undesirable air pollutants. A heated glass reactor was constructed and charged with 23 g (25 ml) of the catalyst in Example 1. The catalyst bed was heated to 250°C, and a synthetic gas mixture, consisting of 0.4% of nitric oxide, 1.5 percent carbon monoxide, and the balance nitrogen, was passed over the catalyst bed at a flow rate of 4 liters/minute. The exit gases were analyzed and, over a period of several hours, it was determined that the nitric oxide had been completely removed from the gas mixture.

EXAMPLE 6

This example shows that a commercially available iron oxide catalyst was ineffective for removing nitrogen oxide from gas streams. The procedure of Example 5 was repeated except that the catalyst used was 28 g (25 ml) of Harshaw Fe-0301 one-eighth inch tabular iron catalyst characterized as follows:

| Bulk Density | 62 lb/ft$^3$ | Composition: 20% $Fe_2O_3$ on activated alumina |
|---|---|---|
| Surface Area | 41 m$^2$/g | |

The exit gases were analyzed, and over a period of several hours, it was determined that only 27 percent of the nitric oxide had been removed from the gas mixture.

We claim:

1. A process for preparing an iron oxide catalyst comprising:
   a. adding iron carbonyl to an inert carrier gas,
   b. flowing the carbonyl containing carrier gas over a suitable support to deposit the carbonyl onto the support at a rate such that the temperature remains in the range of about 0° – 100°C for a period of time sufficient to saturate the support, and
   c. flowing an oxidizing gas over the support while maintaining the temperature below 100°C to oxidize the adsorbed carbonyl to iron oxide.

2. The method of claim 1 wherein the iron carbonyl is iron pentacarbonyl.

3. The method of claim 1 wherein the vaporization temperature is in the range of about 20° – 50°C.

4. The method of claim 1 wherein the oxidation temperature is in the range of 30° – 100°C.

5. The method of claim 1 wherein the oxidizing gas is selected from mixtures of nitrogen and air, nitrogen and ozone, and nitrogen and oxygen.

6. The method of claim 1 wherein the support is selected from activated alumina, modified alumina, activated carbon, silica-alumina, and sodium aluminosilicate.

* * * * *